UNITED STATES PATENT OFFICE.

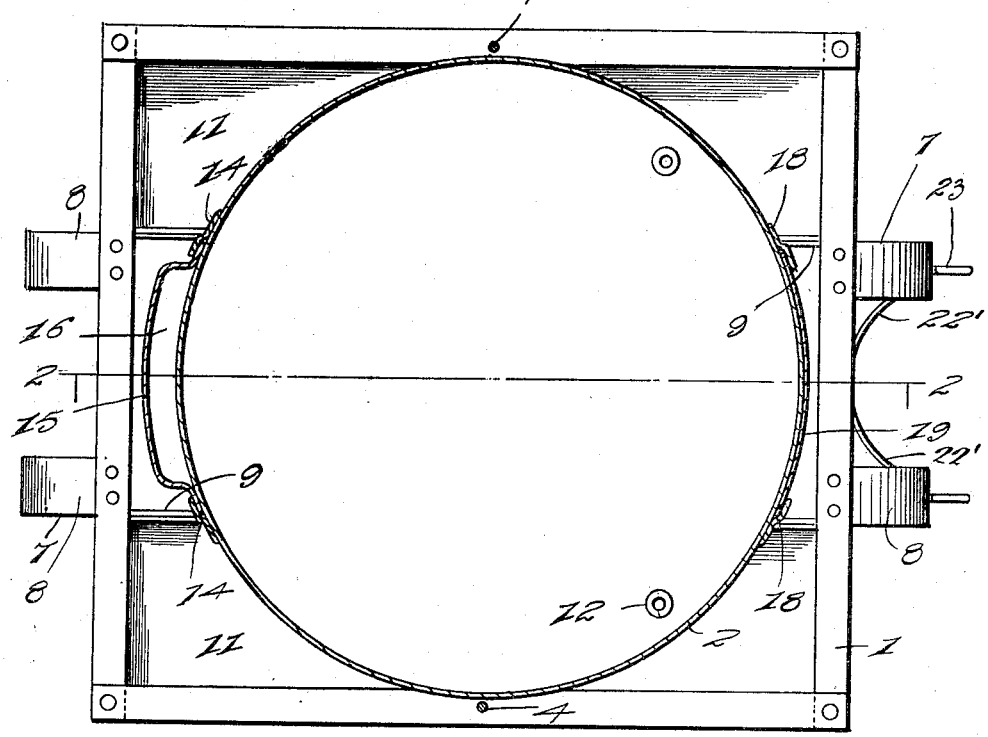

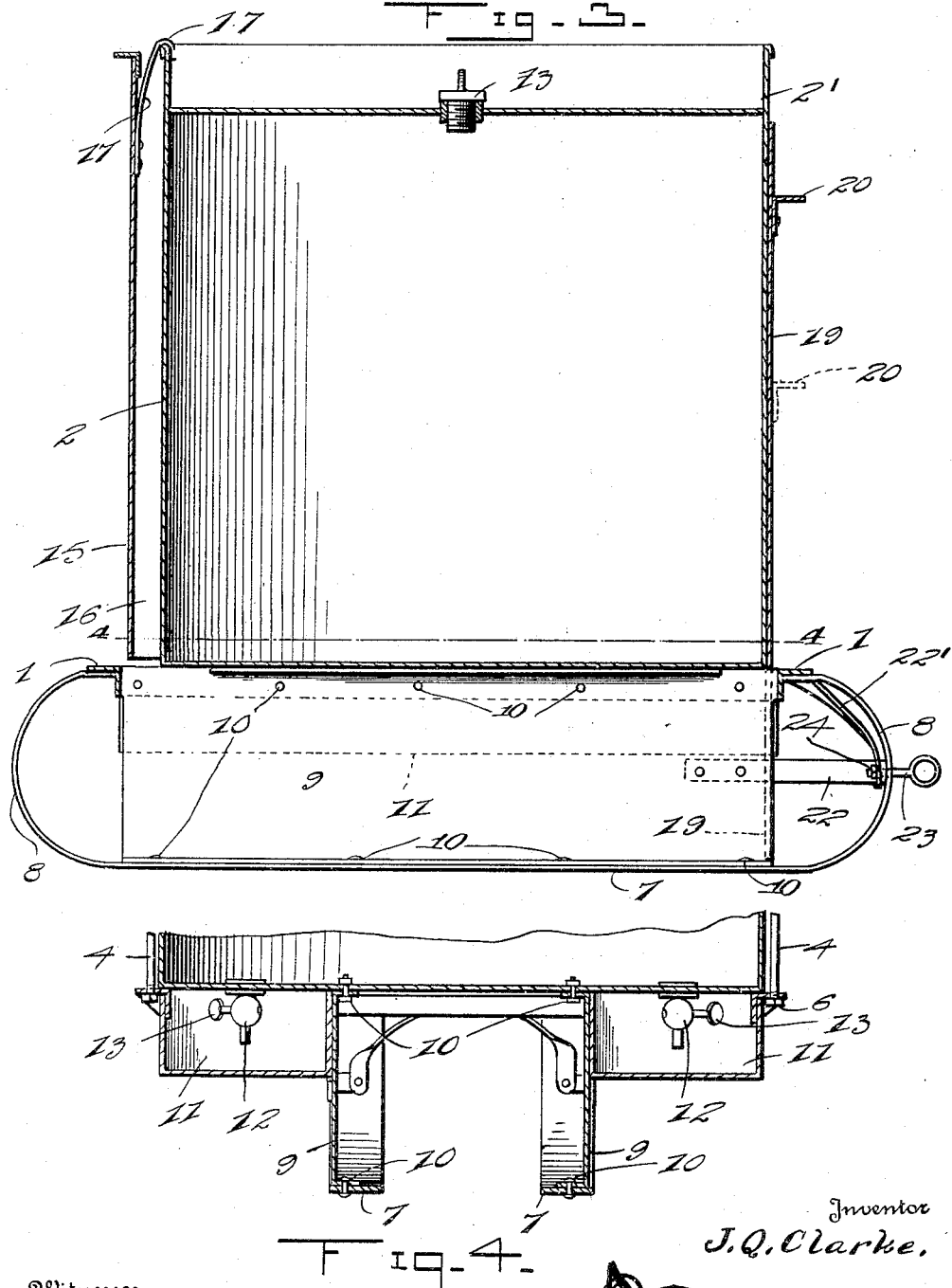

JOHN Q. CLARKE, OF CRAWFORDSVILLE, INDIANA.

STOCK-WATERING DEVICE.

1,206,672.

Specification of Letters Patent.

Patented Nov. 28, 1916.

Application filed December 28, 1915. Serial No. 69,062.

*To all whom it may concern:*

Be it known that I, JOHN Q. CLARKE, a citizen of the United States, residing at Crawfordsville, in the county of Montgomery and State of Indiana, have invented certain new and useful Improvements in Stock-Watering Devices; and I do hereby declare the following to be a full, clear, and exact description of the invention, such as will enable others skilled in the art to which it appertains to make and use the same.

This invention relates to new and useful improvements in stock watering devices constructed of metal or other suitable material, and has for one of its objects the provision of a device of this character, which may be employed for feeding heated or cold water to stock according to the temperature of the weather, so that stock may be given heated or hot drinking water in cold weather and which will not freeze and become inoperative as a stock watering device.

A further object of this invention is the provision of a tank supported upon a frame, which has secured or formed therewith relatively spaced drinking troughs, which receive water from the tank above, providing means whereby the stock may have clean drinking water at all times.

A further object of this invention is the provision of runners, which support the frame away from engagement with the ground and provides means whereby the device may be pulled along the ground to provide a portable drinking device.

A further object of this invention is the provision of a space between the runners, where a lamp or fire may be had for heating the water in the troughs and the tank and which will prevent freezing of the water in cold weather and provide hot or warm drinking water for the stock.

A still further object of this invention is the provision of a slidable chimney carried by the tank, which may be let down into engagement with the ground, to provide a flue, which will conduct the smoke and heat from the lamp or fire, upwardly alongside of the tank so that the water therein will be further heated.

Another more specific object of this invention is the provision of draft regulating means carried by the tank and oppositely disposed to the chimney for the purpose of regulating the draft to the lamp or fire under the tank and between the runners when desired.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings in which:—

Figure 1 is a top plan view partly in section of a stock watering device, constructed in accordance with my invention, Fig. 2 is a rear elevation, illustrating the space between the runners for receiving the lamp or fire to heat the device, Fig. 3 is a longitudinal sectional view, taken on the line 2—2 of Fig. 1, and Fig. 4 is a transverse sectional view taken on the line 4—4 of Fig. 1, illustrating the tank broken away.

Referring in detail to the drawings, 1 indicates a rectangular frame constructed of metal or other suitable material, having mounted thereon, a tank 2, which is provided with a detachable plug 13 for the purpose of filling the tank 2 with water when desired. The tank 2 is detachably secured to the frame 1 by means of rods 4, having their upper ends bent to form hooks, which engage the top of the tank 2 and the lower ends of the rods 4 are screw-threaded and pass through openings in the frame 1 to receive nuts 6, providing means whereby the tank 2 may be removed from the frame 1 so that the device may be stored away in a comparatively small space when desired. The tank 2 is provided with an annular flange 2' upon the top thereof which with the top of the tank 2 provides a filling receptacle, whereby water may be poured therein and by removing the plug 13, the water will run into the tank thus eliminating the necessity of using funnels for filling tanks of this character.

The frame 1 is provided with relatively spaced runners 7, having their ends 8 bent upwardly and rearwardly and secured to the frame 1 by suitable fastening means, (not shown). A pair of side walls 9 are provided with their ends bent at right angles and secured to the bottom of the tank 2 and to the upper face of the runners 7, as illustrated at 10, to provide a vertical closure between the runners 7 and the frame 1 to receive a lamp or any other heating source which will hereinafter be more fully described.

Secured to the under face of the frame 1 is a pair of relatively spaced and transversely extending troughs 11, which are positioned on each side of the runners 7 and extending to points beyond the tank 2 to provide a drinking space for the stock. The tank 2 is provided with a pair of vent-cocks 12, extending downwardly within the troughs 11, whereby water may be automatically fed from the tank into the troughs 11, or may be permanently turned off by the handles 13 when desiring to clean the troughs or to convey the device to another place.

When desiring to have heated water for the stock to drink, a lamp or fire may be made under the tank 2 and between the runners 7, providing means whereby the water in the tank 2 and troughs 11 may be heated, which will prevent the water from freezing in very severe cold weather and rendering the device inoperative for a stock watering device. Upon one side of the tank 2 and in vertical alinement with the runners 7 are a pair of relatively spaced guides 14 to receive a member 15, having its edges bent inwardly and outwardly to provide a space 16 between the member 15 and the tank 2. A spring catch 17 is secured to the upper end of the member 15 and engaging the top of the tank 2 to support said member from engagement with the ground. When desiring to heat the water in the device, the catch 17 is released from the tank 2 and the member 15 is let down into engagement with the ground and between the runners 7, to provide a chimney, which will convey the smoke and heat from the fire or lamp positioned between the runners and under the tank 2, upwardly along side of the tank to further heat the water within the tank.

Secured to the tank 2 and directly opposite the guides 14 are a pair of relatively spaced guides 18, which receive a draft regulating member 19, having a handle 20 thereon, for the purpose of regulating the draft through the fire between the runners 7 as desired, by raising and lowering the member 19 from engagement with the ground.

Secured to the frame 1 is a pair of braces 21, which are secured to the sides 9 adjacent the rear end of the runners 7 to reinforce and prevent the runners 7 from spreading. A substantially U-shaped bracket 22' is secured to the frame 1 and having its ends twisted and apertured to receive a fastening means carried by the front end of each of the runners, which will be hereinafter more fully described. A pair of horizontal braces 22 are secured to the side walls 9 and provided with their free ends bent at right angles to engage the front ends of the runners 7. A pair of eye bolts 23 are carried by the front ends of the runners 7 and pass through the brackets 22' and the right angled end of the braces 22 to receive a nut 24, providing means for securing the braces 22 and the brackets 22' to the runners 7. A chain or other suitable element (not shown), may be attached to the eye bolts 23 for pulling the device upon the runners 7 to various places as desired.

From the foregoing description taken in connection with the accompanying drawings, it will be seen that a stock watering device of the above stated character, is capable of providing stocks with clean and cold or hot water as desired.

While I have shown and described the preferred embodiment of my invention, it will be understood that minor changes in construction, combination and arrangement of parts may be made without departing from the spirit and scope of the invention as claimed.

Having thus described my invention, what I claim is:—

A stock watering device comprising a frame, a tank mounted on said frame, a pair of relatively spaced runners secured to the tank, walls secured to the runners and to the tank to provide side closures for the space between the runners and tank, troughs secured to the tank, a pair of relatively spaced guides secured to the tank, a member provided with its edges bent inwardly and outwardly to be received by said guides to space said member from the tank to provide a chimney, and a draft regulating member slidably secured to the opposite side of the tank from said member to regulate the draft of the chimney.

In testimony whereof I affix my signature in presence of two witnesses.

JOHN Q. CLARKE.

Witnesses:
JAMES S. KELLY,
ROBERT W. MARTIN.